US011972462B1

(12) United States Patent
Alava et al.

(10) Patent No.: US 11,972,462 B1
(45) Date of Patent: Apr. 30, 2024

(54) SYSTEM AND METHODS FOR DETECTING AND INSURING SPECIALTY PRODUCTS

(71) Applicant: United Services Automobile Association (USAA), San Antonio, TX (US)

(72) Inventors: Galo M. Alava, Tampa, FL (US); Amanda Michelle Boyd, Denver, CO (US); Ramsey Devereaux, San Antonio, TX (US); Gregory Mark Lamontagne, Helotes, TX (US); Elizabeth J. Rubin, San Antonio, TX (US); Brian Tougas, Spring Branch, TX (US); Courtney St. Martin, Forney, TX (US); Michael Kyne, Saint Petersburg, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/722,023

(22) Filed: Apr. 15, 2022

Related U.S. Application Data

(60) Provisional application No. 63/176,727, filed on Apr. 19, 2021.

(51) Int. Cl.
*G06Q 30/02* (2023.01)
*G06Q 30/0601* (2023.01)
*G06Q 40/08* (2012.01)

(52) U.S. Cl.
CPC ..... *G06Q 30/0278* (2013.01); *G06Q 30/0635* (2013.01); *G06Q 40/08* (2013.01)

(58) Field of Classification Search
CPC . G06Q 30/0278; G06Q 30/0635; G06Q 40/08
(Continued)

(56) References Cited

U.S. PATENT DOCUMENTS 7,610,216 B1 * 10/2009 May ............. G06Q 30/04
705/18
8,306,908 B1 * 11/2012 Barker ............ G06Q 30/0224
705/26.7
(Continued)

OTHER PUBLICATIONS

He, et al., Assortment Size and Performance of Online Sellers: An Inverted U-Shaped relationship, Journal of the Association for Information Systems 20(10), 1503-1530, doi 10.17705/jais.00576, (Year: 2016).*

Primary Examiner — Frantzy Poinvil
(74) Attorney, Agent, or Firm — Fletcher Yoder, PC

(57) ABSTRACT

A system includes a computing device comprising a memory storing instructions configured to cause a processor to receive: purchase data associated with products purchased by a user, online activity data performed by the user and other users and associated with information pertaining to the products, and vendor information comprising retail sales data, after-market sales data, and product availability associated with the products. The processor determines one or more values of the products based on the purchase data, the online activity data, and the vendor information and whether the purchased products correspond to specialty products based on the purchase data, the online activity data, and the values of the products. The processor may then send a notification to the user comprising an offer for insurance for the products in response to determining the products correspond to specialty products.

20 Claims, 5 Drawing Sheets

(58) Field of Classification Search
USPC .......................................................... 705/3–44
See application file for complete search history.

(56) References Cited

U.S. PATENT DOCUMENTS

| | | | | |
|---|---|---|---|---|
| 8,583,564 | B2* | 11/2013 | Wiseman | G06Q 30/0601 |
| | | | | 705/14.1 |
| 2005/0289039 | A1* | 12/2005 | Greak | G06Q 40/04 |
| | | | | 705/37 |
| 2009/0254971 | A1* | 10/2009 | Herz | G06Q 30/0603 |
| | | | | 726/1 |
| 2011/0112869 | A1* | 5/2011 | Greak | G06Q 30/0601 |
| | | | | 705/26.1 |
| 2013/0041781 | A1* | 2/2013 | Freydberg | G06Q 30/06 |
| | | | | 705/27.1 |
| 2013/0346172 | A1* | 12/2013 | Wu | G06Q 30/0214 |
| | | | | 705/14.16 |
| 2016/0314519 | A1* | 10/2016 | Liu | G06Q 50/01 |
| 2019/0325498 | A1* | 10/2019 | Clark | G06Q 30/0625 |
| 2019/0340700 | A1* | 11/2019 | Haas | G06Q 40/12 |
| 2021/0056580 | A1* | 2/2021 | Walker | G06Q 30/0222 |

* cited by examiner

SYSTEM AND METHODS FOR DETECTING AND INSURING SPECIALTY PRODUCTS

CROSS-REFERENCE TO RELATED APPLICATIONS

The present disclosure is related to, and claims priority to, U.S. Provisional Patent Application Ser. No. 63/176,727, titled "Systems and Methods for Detecting and Insuring Specialty Products," which was filed on Apr. 19, 2021, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

As insurance companies become more capable of receiving and analyzing data from various data sources, the insurance companies may use the acquired and analyzed data to offer particular insurance packages for products. That is, insurance packages may be provided for products and property that are not traditionally covered by insurance policies or are inadequately covered by insurance policies. Indeed, the improved ability to monitor product and property ownership and value provides insurance companies an improved ability to provide different insurance packages to insure various items that may be difficult to assess value.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include a computing device comprising a processor and a memory. The memory stores instructions configured to cause the processor to receive: purchase data associated with one or more products purchased by a user; online activity data associated from a plurality of sources, wherein the online activity is indicative of a plurality of activities performed by the user, wherein the plurality of activities is associated with information pertaining to the one or more products; additional online data from the plurality of sources, wherein the additional online data is indicative of an additional plurality of activities performed by one or more other users, wherein the additional plurality of activities is associated with additional information pertaining to the one or more products; and vendor information from one or more vendors comprising retail sales data, after-market sales data, and product availability associated with the one or more products. The processor may further be configured to determine one or more values of the one or more products based on the purchase data, the online activity data, the additional online data, and the vendor information. The processor may further be configured to determine whether the one or more products correspond to one or more specialty products based on the purchase data, the online activity data, the additional online data, and the one or more values of the one or more products. The processor may also be configured to send a notification to a computing device associated with the user in response to the one or more products corresponding to the one or more specialty products, wherein the notification comprises an offer for insurance for the one or more products.

In another embodiment, a non-transitory, computer-readable medium may include computer-executable instructions, that when executed, cause a processor to receive: purchase data associated with one or more products purchased by a user; online activity data from a plurality of sources, wherein the online activity is indicative of a plurality of activities performed by the user, wherein the plurality of activities is associated with information pertaining to the one or more products; additional online data from the plurality of sources, wherein the additional online data is indicative of an additional plurality of activities performed by one or more other users, wherein the additional plurality of activities is associated with additional information pertaining to the one or more products; and vendor information from one or more vendors comprising retail sales data, after-market sales data, and product availability associated with the one or more products. The processor may further be configured to determine one or more values of the one or more products based on the purchase data, the online activity data, the additional online data, and the vendor information. The processor may further be configured to determine whether the one or more products correspond to one or more specialty products based on the purchase data, the online activity data, the additional online data, and the one or more values of the one or more products. The processor may also be configured to send a notification to a computing device associated with the user in response to the one or more products corresponding to the one or more specialty products, wherein the notification comprises an offer for insurance for the one or more products.

In another embodiment, a method may include receiving, via a processor: purchase data associated with one or more products purchased by a user; online activity data from a plurality of sources, wherein the online activity is indicative of a plurality of activities performed by the user, wherein the plurality of activities is associated with information pertaining to the one or more products; additional online data from the plurality of sources, wherein the additional online data is indicative of an additional plurality of activities performed by one or more other users, wherein the additional plurality of activities is associated with additional information pertaining to the one or more products; and vendor information from one or more vendors comprising retail sales data, after-market sales data, and product availability associated with the one or more products. The method may further include determining, via the processor, one or more values of the one or more products based on the purchase data, the online activity data, the additional online data, and the vendor information. The method may further include determining, via the processor, whether the one or more products correspond to one or more specialty products based on the purchase data, the online activity data, the additional online data, and the one or more values of the one or more products. The method may further include sending, via the processor, a notification to a computing device associated with the user in response to the one or more products corresponding to the one or more specialty products, wherein the notification comprises an offer for insurance for the one or more products.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
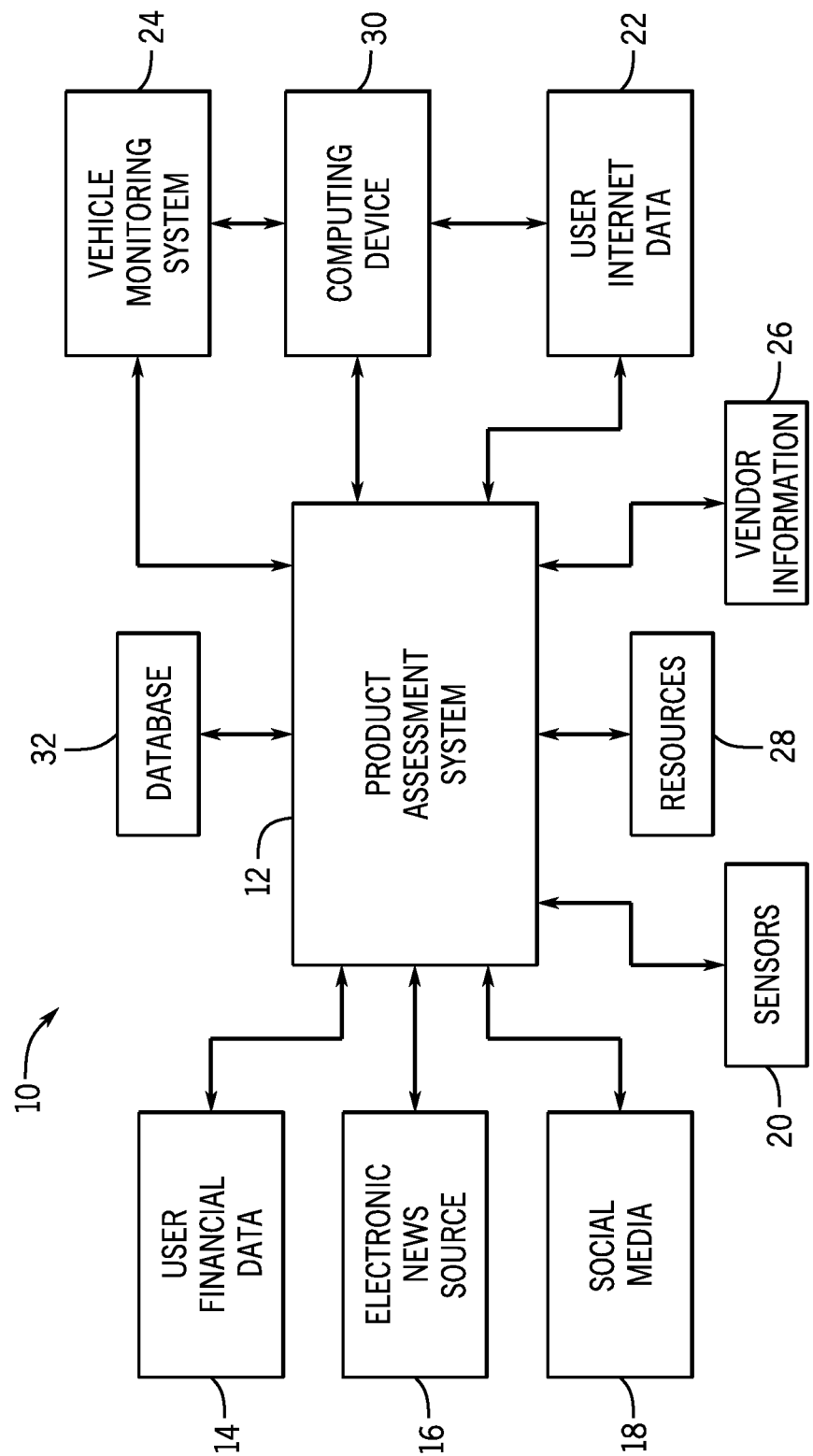
FIG. 1 illustrates a block diagram of a product assessment system for assessing potential insurable products based on received data, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

The present disclosure relates generally to identifying potentially insurable products and digital media based on data received from a number of sources. More specifically, the present disclosure relates to detecting ownership of a specialty product, digital media product, digital media presence, and other types of media based on received data and providing insurance packages to cover the identified product or presence.

Specialty products may include a select portion of a set of products that are produced in limited quantities, have unique features, and the like. These products are becoming more prevalent in our society each day and span a variety of different fields. Designer sneakers, baseball cards, vinyl records, sports memorabilia, collectible figurines, alcohol, and the like are released by vendors in limited quantities to increase demand for the product, gain publicity for the manufacturer, and the like. As users purchase these products from retail vendors at retail price, the availability of the products decrease. Due to the increased demand of certain specialty products and the decreased availability of those respective products from retail vendors, the after-market value of these products may exceed the retail price paid by the user. As a result of the increased value of the product, it may be advantageous for a user to insure the specialty product to protect against damage, loss, theft, or other problems that a user may encounter with the product.

Similarly, digital media products are being created that may have a particular value associated with the product. Digital media products may include different characters or avatars that a user may develop as the user progresses through a game, a virtual environment, a digital profile, and the like. For example, using a gaming console, a user may develop characters or avatars for different games that are rare and may be transferred or sold to others. As an increased amount of time is spent developing the product, and as the popularity of the digital media product increases, so too may the value of the digital media product increase. Thus, it may be advantageous for a user to insure the digital media product to protect against data corruption, storage failure, technical malfunctions, or any other problems that a user may encounter with the digital media product.

Further, digital media presences are being created that may generate revenue for a user. Digital media presences may include social media influencers, podcasters, musicians, performers, and the like. As a user invests an increased amount of time and resources into a particular digital media presence, the value of the digital media presence may increase. Additionally, an individual may purchase equipment, props, and the like to optimize or enhance the digital media presence in a particular way. For example, a social media influencer gaining followers may invest in a social media presence by purchasing certain equipment (e.g., cameras, lights, props, etc.) to help develop content for the presence. As the digital media presence gains notoriety, the individual may be able to generate an income through the use of advertisements, endorsements, payments, and the like. The user may depend on this digital media presence as a source of income. As a result, it may be advantageous for a user to insure the digital media presence to allow for continued income when the digital media presence is compromised for technical reasons, or to protect against data corruption, storage failure, or any other problems the user may encounter with the digital media presence.

The products and digital media presences described above may not be captured by traditional insurance markets. As such, it may be beneficial to have systems able to detect when these products and presences are purchased, acquired, or created and when their value or ability to generate revenue starts exceeding certain thresholds, so individuals may be provided an opportunity to protect and insure those products that are of value to them. The present embodiments described herein may detail various hardware components and methodologies that may enable an insurance provider to detect the presence of these products and/or presences, offer insurance packages to cover the risks associated with the loss of the products and/or presences, ascertain values for the products and/or presences, and the like. Additional details related to providing these services to individuals will be discussed below with reference to FIGS. 1-5.

By way of introduction, FIG. 1 illustrates a block diagram of a system 10 in which a product assessment system 12 may receive data that may be used to assess the demand, availability, popularity, and value of certain specialty products, digital media products, and digital media presences in accordance with embodiments presented herein. Referring to FIG. 1, the product assessment system 12 may receive data from various sources. The received data may be related to value, demand, availability, or popularity of a particular product. Using the collected data, the product assessment system 12 may determine an after-market value of a product. That is, the product assessment system 12 may analyze the collected data to determine whether an after-market demand for the product exists and whether the product has an increased value associated with the after-market demand. If the value exceeds a certain threshold, the product assessment system 12 may send a notification to a user indicating that potential insurance packages may be available to cover the identified product.

In some embodiments, the product assessment system 12 may be any suitable computing or server device. Using data sources (e.g., databases, news resources, social media sources, online sources, sensors) accessible to the product assessment system 12, the product assessment system 12 may receive data regarding the specialty products, digital media products, and digital media presences associated with a particular user. For example, the product assessment system 12 may receive data from sources such as user financial data 14, electronic news sources 16, social media 18, sensors 20, user internet data 22, vehicle monitoring system 24, vendor information 26, and other resources 28.

The user financial data 14 may include information regarding the user's purchases and bank account information associated with the user. The user financial data 14 may include sales and purchases from an e-wallet, credit card purchases, automatic teller machine (ATM) withdrawals, and online account purchases (e.g., eBay® and Amazon®) associated with a particular user. User financial data 14 may also include ATM deposits, payments received, endorsements received, and the like that may indicate that the individual has received payment or income from a particular product or presence. The user financial data 14 may be acquired by mining data sources such as credit card databases, bank account databases, and other sources that have access to the individuals' purchase history and financial records. In some embodiments, the user financial data 14 may be directly input by a user into the product assessment system 12 via a software application that provides recommendations for coverage of certain products based on the received data. In other embodiments, the product assessment system 12 may push a notification to a user's computing device recommending coverage based on the analysis described below.

The electronic news sources 16 may include various news services and sources that may be updated in real time or near real time via a network (e.g., Internet). The electronic news sources 16 may provide information regarding popularity of certain products, celebrity endorsement information associated with certain products, post-mortem information associated with certain products (e.g., memorabilia after celebrity death), and any other information that may be published via an electronic news outlet such as a webpage, news database, microblogging service, social media outlet, or the like. Such information may be used by the product assessment system 12 to help determine the value of a particular product (current value or future value). Certain endorsements by celebrities may result in an increase in value of the product. Further, if a particular celebrity associated with a product were to expire, the product might experience an increase in value due to the celebrity's death. The electronic news sources 16 may keep the product assessment system 12 up to date with news on industries and/or manufacturers associated with a particular product at various geographical scales (e.g., city, country, region, world) to ensure that the product assessment system 12 makes determinations based on updated information. Additionally, the electronic news sources 16 may provide data to the product assessment system 12 related to which products are most popular for an upcoming holiday season. The product assessment system 12 may also search for other newsworthy events that might decrease the value of a particular product. For example, if a celebrity associated with a particular product is receiving significant negative attention from the media, the product assessment system 12 may use this information as an indicator that the product associated with the celebrity may not be as valuable as it once was due to the decline of the celebrity's popularity.

The social media 18 may include data from available social media sites such as Facebook®, Twitter®, Instagram®, TikTok®, Twitch®, Reddit®, YouTube®, and the like. In one embodiment, the social media 18 may include information associated with the individual using the product assessment system 12. For example, the social media 18 may be associated with a user's personal Instagram® account, and may include information regarding the user's followers, accounts subscribed to by the user, product searches, interests, and the like. The social media 18 may also include data trending on social media sites that may not be directly associated with the individual. The data from the social media 18 may include information regarding popularity of a product, demand for a product, availability of a product, and value of a product. For example, vendors may use the social media 18 to advertise a particular product. The product assessment system 12 may receive information related to or determine the popularity of a product based on the comments associated with the product, the number of people interested in the product, and a detected or recorded frequency or number of references to the product via the social media 18 sites. In some embodiments, the social media 18 may include crowd source data that is updated in real time (e.g., near instantaneous). Although the crowd source data may not be verified, it can often provide information related to an event more quickly than certain electronic news sources 16.

The sensors 20 may include any type of device capable of measuring location, pressure, moisture, temperature, light, sound, and the like. One or more sensors 20 may be disposed in different types of property, such as a home, a vehicle, and the like. In certain embodiments, one or more sensors 20 may be disposed within certain rooms of the home, within the vehicle, or outside the vehicle. The sensors 20 may also be disposed on devices carried or worn by individuals. For example, a user's mobile device may include a sound sensor 20 configured to capture sound data associated with the user. Sounds captured by the sound sensor 20 may correspond to conversations held between the user and another individual, and the sound data may be indicative of a user's interest in a particular product. In one embodiment, the sensors 20 may provide location information regarding the sensors 20. As such, the sensors 20 may provide global positioning system (GPS) coordinates and the like to indicate a location of the sensors 20. In other embodiments, the sensors may include home network device sensors (e.g., Amazon Alexa®, Amazon Echo®, Apple HomePod®, Google Home®, etc.) which may be configured to receive voice commands from a user. The product assessment system 12 may use the commands received from the voice sensors to determine products the user may have interest in as well as products that the user may have already purchased. The product assessment system 12 may use this information in conjunction with other purchase and financial data 14 of a user to identify products that the user owns.

In addition, the sensors 20 may provide data regarding the physical properties associated with an individual's home. For example, the sensors 20 may be disposed within the user's home and provide information regarding temperature, humidity, pressure, and the like to determine whether the conditions inside the home are suitable for maintaining the condition of a particular specialty product.

The sensors 20 may also include an image sensor that may acquire image data of the individual. The image data concerning an individual may provide information related to the amount of time spent developing a digital media product or presence.

Referring back to FIG. 1, the user internet data 22 may include data from the user's search history, time spent online, time spent on particular applications, time spent on particular pages associated with certain products or presences, and the like. Similar to the social media 18, the user internet data 22 may also include information associated with the pages the user follows, community groups associated with the user, streaming videos that the user watches, and the like. The user's search history may contain information indicating products of interest to the user. Increased time spent searching for a particular product may indicate a heightened desire for the user to acquire the particular product. The product assessment system 12 may log the time spent on particular retail applications or on social media applications. The product assessment system 12 may then use this information to determine that a user has an increased interest in a particular product. Such an increased interest may be used by the product assessment system 12 to indicate to the system that insuring the particular product may be of interest to a particular user.

The vehicle monitoring system 24 may be associated with certain sensors 20 to provide GPS information concerning a user's location to the product assessment system 12. The vehicle monitoring system 24 may provide information including time spent driving to particular stores, time spent waiting at certain locations, and the like. The GPS information provided by the sensors may also allow the product assessment system 12 to notify individuals of certain items that have been released nearby based on the proximity of the vehicle to the drop locations.

The vendor information 26 may include retail sales data, release-date data, after-market sales data, product availability, and the like. The vendor information 26 may be acquired by mining data sources such as online product catalogs, internet sales information, various vendors, and the like. The vendor information 26 may be used by the product assessment system 12 to determine the value of a product before it is available for sale and to determine the after-market value of the product once it has been released to the public. Vendor information 26 may also include information from the social media 18 such that the vendor information 26 includes sales data and advertisement data that has been projected on the social media 18 platforms. Further, the vendor information 26 may include data related to other individuals selling similar products without the use of a particular re-sale application. The product assessment system 12 may use this vendor information to compare prices to determine the value of a particular product.

The resources 28 may include any other electronic information that may be available via a network, the Internet, or the like. In certain embodiments, the resources 28 may include data, such as online traffic and online data from other individuals, purchase and sales data from other individuals, location information of other individuals, and the like. The resources 28 may also include any other data that may provide insight regarding the value, demand, and availability of certain products.

With the foregoing in mind, the product assessment system 12 may receive data from the various sources described above to identify potentially insurable specialty products, digital media products, and digital media presences. The product assessment system 12 may also determine a current value associated with the specialty products, the digital media products, and the digital media presences. After determining that the value is above some threshold, the product assessment system 12 may send a notification or alert to a computing device 30 associated with the individual via a network or via a direct communication link. The product assessment system 12 and the computing device 30 may include any suitable computing device such as a general-purpose computer, a mobile computing device, a laptop-computing device, a tablet computing device, a wearable computing device, and the like. Additional details with regard to the product assessment system 12 will be discussed below with reference to FIG. 2.

After receiving the notification, the computing device 30 may provide an indication that the notification was received and automatically display the notification suggesting insurance coverage for the particular product via a text message, an email message, an alert, or the like. In some embodiments, the indication may be activated despite the computing device 30 being in a sleep or low power mode to increase the likelihood that the user will take note of the notification. In any case, the notification may notify the user of the potential increased value of certain products and insurance packages available to cover the identified products.

After sending the notification to the computing device 30, the product assessment system 12 may store data related to the notifications transmitted to the computing device 30, and other detected data in a database 32. The product assessment system 12 may also store information regarding any determinations made by or data acquired by the product assessment system 12. For example, the product assessment system 12 may store the data acquired via the sensors 20 or the information gleaned from the electronic news sources 16, the social media 18, the user internet data 22, the vendor information 26, and the resources 28, or the like in any suitable storage component. Additionally, the product assessment system 12 may store information regarding the behavior of the individual based on the data gathered via the user financial data 14, the user internet data 22, the vehicle monitoring system 24, the resources 28, or the like.

Figure 2:
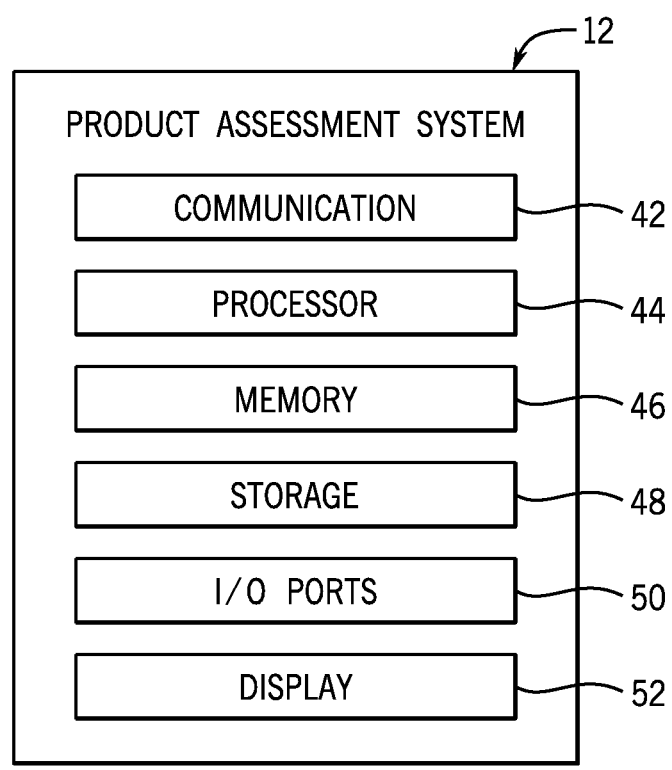
FIG. 2 illustrates a block diagram of a computing device that may be part of the product assessment system of FIG. 1, in accordance with embodiments described herein.

To perform some of the actions set forth above, the product assessment system 12 may include certain components to facilitate these actions. FIG. 2 is a block diagram of example components within the product assessment system 12. For example, the product assessment system 12 may include a communication component 42, a processor 44, a memory 46, a storage 48, input/output (I/O) ports 50, a display 52, and the like. The communication component 42 may be a wireless or wired communication component that may facilitate communication between product assessment system 12, the sensors 20, the vehicle monitoring system 24, the database 32, the computing device 30, and the like. Additionally, the communication component 42 may facilitate data transfer to the product assessment system 12, such that the product assessment system 12 may receive the user financial data 14, the electronic news sources 16, the social media 18, the user internet data 22, the vendor information 26, the resources 28, and the like.

The processor 44 may be any type of computer processor or microprocessor capable of executing computer-executable code. The processor 44 may also include multiple processors that may perform the operations described below.

The memory 46 and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. The memory 46 and the storage 48 may also be used to store data described, various other software applications for analyzing the data, and the like. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may be interfaces that may couple to other peripheral components such as input devices (e.g., keyboard, mouse), sensors, input/output (I/O) modules, and the like. The display 52 may operate to depict visualizations associated with software or executable code being processed by the processor 54. In one embodiment, the display 52 may be a touch display capable of receiving inputs from a user of the product assessment system 12. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the product assessment system 12.

It should be noted that the components described above with regard to the product assessment system 12 are exemplary components and the product assessment system 12 may include additional or fewer components as shown. Additionally, it should be noted that the vehicle monitoring system 24 and the computing device 30 may also include similar components as described as part of the product assessment system 12.

Specialty Products

Figure 3:
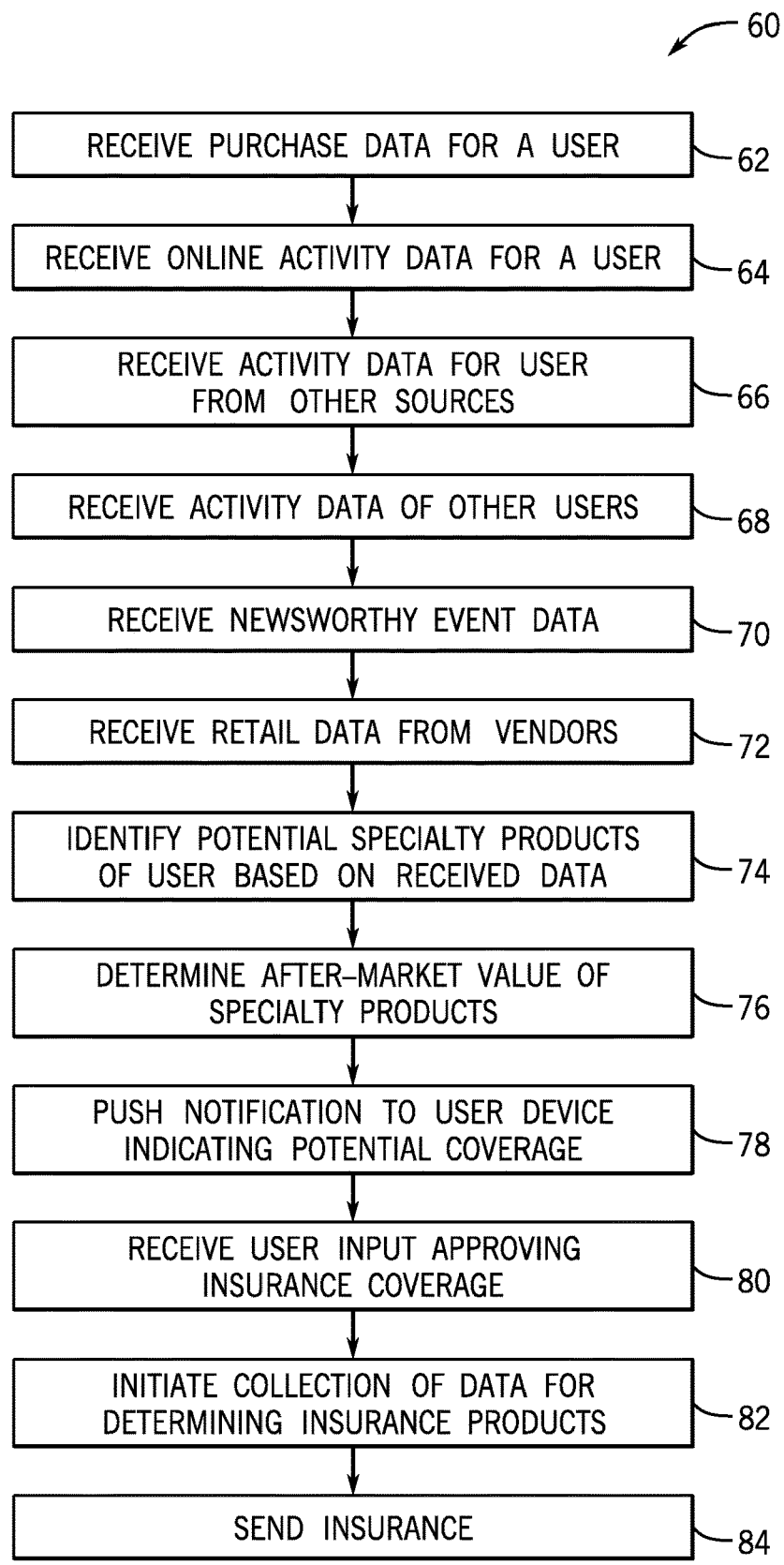
FIG. 3 illustrates a flow chart of a method for identifying, valuing, and insuring products based on received data, in accordance with embodiments described herein.

With the foregoing in mind, FIG. 3 illustrates a flow chart of a method 60 employed by the product assessment system 12 for sending notifications suggesting insurance packages covering identified specialty products. Although the following description of the method 60 is described in a particular order, it should be noted that the method 60 is not limited to the depicted order; and instead, the method 60 may be performed in any suitable order. In addition, although the product assessment system 12 is described as performing the method 60, it should be understood that the method 60 may be performed by any suitable computing device including, for instance, the computing device 30 and the like.

Referring now to FIG. 3, at block 62, the product assessment system 12 may receive purchase and financial data related to an individual. As discussed above, the product assessment system 12 may receive purchase and user financial data 14 from various sources including banks, credit unions, credit card companies, retailers, e-wallet accounts, merchant hosting accounts, online distributor accounts, and the like. Generally, the purchase and financial data received at block 62 may provide information regarding the purchase history for the individual associated with the product assessment system 12. In some embodiments, the product assessment system 12 may mine the individual's bank account information, credit card account information, online purchase records, online sale records, or other suitable information source and cross-reference these various sources to determine what the user has purchased and an amount spent on such a purchase. The product assessment system 12 may store this purchase history and the financial data 14 in the memory 46 and storage 48, in the database 32, and the like.

At block 62, the purchase and financial data 14 received by the product assessment system 12 may be directly associated with purchases of the specialty products themselves (e.g., shoes, vinyl records, sports memorabilia, etc.). The product assessment system 12 may also receive purchase and financial data related to ancillary products that the individual may make. For example, an individual purchasing several display cases may indicate to the product assessment system 12 that the individual has a specialty product that he wishes to display. The product assessment system 12 may analyze and monitor an individual's purchase history and financial data to identify and determine products that the user has purchased. The product assessment system 12 may then offer insurance packages based on the user's purchases.

At block 62, the purchase and financial data 14 may also include data related to payments and other income an individual may receive related to particular specialty products. That is, the product assessment system 12 may store any sale information that the user may make and query this data when the user is preparing to make another sale. For example, a user may purchase two bottles of a particular whiskey from a retail vendor. When the user decides to sell one of the bottles on the after-market, the product assessment system 12 may retrieve this sales data from the user's financial records and if the user decides to sell the other bottle that was purchased, the product assessment system 12 has information related to the potential value of the product based on the first sale. This type of data may also be captured as vendor information as will be described in greater detail below with reference to block 72.

At block 64, the product assessment system 12 may receive online activity data of an individual associated with the product assessment system 12. The online activity data may be retrieved from the social media 18, the user internet data 22, and the other resources 28 via a network, the Internet, or the like. The product assessment system 12 may then use the received online data to identify and determine products that interest the user. The online activity data may include information regarding the user's search history, time spent looking at particular social media pages, time spent contacting potential vendors (e.g., via phone call, emails, etc.), time spent on particular applications, groups the user may belong to, and other general internet searches that may provide information regarding a particular user's interests.

For instance, the more time spent on a particular application or more time spent looking for a particular product may indicate to the product assessment system 12 that the user has an increased interest in the product. A particular user may also flag or mark items that he may be interested in and the product assessment system 12 may use this information to keep track of those items. By cross-referencing the user's financial information with the flags or time associated with various items, the product assessment system 12 may determine when a user purchases or acquires an item that he has flagged, marked, or observed and may use this data to identify the product as a potentially insurable specialty product.

For example, an individual following certain social media pages that advertise or sell a particular brand or type of shoes may indicate to the product assessment system 12 that the user has an increased interest in the shoes. Similarly, a user spending more than a threshold amount of time on a website that sells vinyl records may indicate to product assessment system 12 that the user has an interest in certain records. Once the online activity time or searches associated with a particular product exceeds a certain threshold, the product assessment system 12 may use this information to identify items of increased interest to the user that may warrant insurance coverage. In some embodiments, the product assessment system 12 may employ an algorithm to quantify an amount of interest of the user in a particular product based on the amount of time spent searching for the product, the amount of searches performed by the user associated with the product, an amount of time on a particular application associated with the product, and the like. In turn, based on the amount of interest of the user in a particular product exceeding a threshold value, the product assessment system 12 may determine that the product is a specialty product that may warrant insurance coverage. For example, the product assessment system 12 may assign a number of interest points to a user for a particular product, thereby enabling the product assessment system 12 to quantify the amount of interest the user has in the particular product. In some embodiments, based on the amount of time spent searching for a particular product exceeding a threshold amount of time, the product assessment system 12 may assign interest points (e.g., 10 interest points) to the user for the particular product indicative of the user's increased interest in the particular product. Similarly, interest points may be assigned to the user based on the number of searches for the particular product exceeding a threshold number of searches, the amount of time on an application associated with the particular product exceeding a threshold amount of time, a number of trips to a vendor selling the particular product exceeding a threshold number of trips, and the like. Upon determining that the amount of interest points exceeds a threshold amount of points, the product assessment system 12 may determine that the user's amount of interest in the particular product exceeds a threshold amount of interest and thus the product corresponds to a specialty product that warrants insurance coverage.

Further, in some embodiments, the algorithm used by the product assessment system 12 may determine the amount of interest points to assign for various different types of inputs. For example, the algorithm may assign a heavier weight (and thus a higher number of interest points) to information related to the amount of time the user spends searching for the particular product and assign a lighter weight to information related to the number of trips by the user to a vendor selling the particular product. Thus, the product assessment system 12 may determine that a particular product is a specialty product when the amount of time searching for the product exceeds a threshold amount of time, despite the user not belonging to any groups associated with the particular product or without the user making any trips to a vendor selling the particular product.

Additionally, at block 66, the product assessment system 12 may receive data for a user associated with the product assessment system 12 from other sources. The data from other sources may be retrieved by the sensors 20, the vehicle monitoring system 24, or the other resources 28. The data from other sources may include information regarding a user's location and proximity to certain vendors (e.g., both retail and after-market) or product drop locations. For example, the product assessment system 12 may use GPS location information from the sensors 20 and the vehicle monitoring system 24 to determine that a user is within a proximity of a particular store that is about to release a potential specialty product. Longer wait times outside of a particular store (e.g., as detected based on online data, social media data, etc.) may indicate to the product assessment system 12 that the user has an increased interest in the item that is about to be released. That is, users who are willing to stand in line for more than a threshold period of time may have an increased interest in the product as compared to other consumers or the general population. Additionally, wait lines could correspond to higher demand since the availability of the product is limited to a subset of a total number of people interested in acquiring the product. The product assessment system 12 may receive this relevant data to help determine which products may warrant insurance coverage. Similarly, several trips to a particular vendor may also indicate to the product assessment system 12 a user's increased interest in a particular product because the user keeps returning to the store trying to acquire the product.

The product assessment system 12 may also receive data from the sensors 20 located within the user's home. As described above, the sensors 20 may receive measurements of a particular variable (e.g., temperature, humidity, pressure, and the like), which may be used to determine whether the conditions inside the home are suitable for maintaining the condition of a particular specialty product. For example, using the received data described above, the product assessment system 12 may recognize that a user has purchased a valuable baseball card. Using the data received from the sensors 20 inside the home, the product assessment system 12 may determine that the humidity level is above some threshold and may create conditions that may decrease the value of the baseball card. The product assessment system 12 may use this information to warn users that the conditions inside the home are not optimal for maintaining the value of the card that the user has already invested in. That is, the product assessment system 12 may send a notification to the computing device 30 or other component that automatically creates a visualization, an audible alert, a haptic (e.g., vibration) alert, or the like to notify the user of the detected condition. The product assessment system 12 may also use the notification to present an alert related to an offer for additional insurance to cover the identified product as described below or prompt users to remedy the problem to avoid damaging their specialty product.

At block 68, the product assessment system 12 may receive activity data (e.g., online data, traffic data) of other users that may share interests with the user of the product assessment system 12. The activity data of other users may be retrieved by the social media 18, and the other resources 28 via a network, the Internet, or the like. The activity data (e.g., network traffic data) of other users may include information regarding the demand, value, availability, and popularity of certain products, and may be used by the product assessment system 12 to determine whether a potential after-market exists for the products and the after-market value after the products have been purchased from the retail vendors. The activity data (e.g., network traffic data) may be determined based on a number of people searching for a particular product, a number of people waiting in line for a product to be released, a cumulative amount of searches performed by the other users, a cumulative amount of time spent by the other users searching for a particular product, a price that other users are selling certain related items, and other related information that the product assessment system 12 may use to help determine the value of the product based on the availability, the popularity, and the demand for the product.

For example, the product assessment system 12 may receive information from the social media 18 that indicates that a particular product may be released on an upcoming date. As the release date approaches, the product assessment system 12 may receive and analyze data from the social media 18 that suggests that a number of individuals are interested in the product. As more people follow particular pages associated with certain products, the product assessment system 12 may use this information as an indicator that the product has increased in popularity. This increased social media attention associated with a particular product may also correspond to an increased demand for the product that may be associated with an increased value of the product. The product assessment system 12 stores this information as described above and uses this information in conjunction with the other received data to determine whether insurance may be warranted to cover a particular product that an individual has purchased. It should be noted that the product assessment system 12 is not limited to just social media data and may receive data from various online sources, offline sources (e.g., data concerning people waiting at stores), and the like.

In some embodiments, the product assessment system 12 may receive activity data from other sources other than online sources. For example, the product assessment system 12 may also receive location data of other users similar to the location data described above. When the product assessment system 12 receives data indicating that a threshold number of individuals are gathering at a particular location, the product assessment system 12 may use this data to determine whether a particular specialty product is being released. Similar to the information received from the social media 18 described above, the product assessment system 12 may recognize that in increased number of individuals at a particular location indicates an increased popularity of the product. As a result of this increased popularity, the product assessment system 12 may recognize an increased demand associated with a particular product and may use this information to identify specialty products that may warrant insurance coverage.

At block 70, the product assessment system 12 may receive newsworthy event data associated with certain products from the electronic new sources 16, the social media 18, and the other resources 28. The newsworthy event data may include data regarding the availability, demand, and value of certain products. For example, the newsworthy event data may include information that indicates that a particular product is profiled in a periodical prior to an upcoming holiday season. As notoriety spreads and as these products gain attention, news sources may advertise the product thereby increasing popularity and demand as more people are aware of the potential products. The number of advertisements detected in the electronic new sources 16, the social media 18, and the other resources 28 may correspond to an increase in popularity or demand.

In some embodiments, the newsworthy event data may include data regarding a celebrity or athlete's endorsement or association with a particular product. Such an endorsement or association may be used by the product assessment system 12 to indicate the potential for an increased value of the product associated with the endorsement or association. For example, consider a home run ball hit by Barry Bonds. Once the ball leaves the stands, it becomes a collectible item that has a particular value. If Barry Bonds were to autograph the baseball, the value of the product would increase significantly and the product assessment system 12 would be able to receive data indicating the increased value of the baseball due to the athlete's association with the product (e.g., a news report that indicates that Bonds signed the ball). The newsworthy event data may also include information about a particular celebrity, athlete, or endorsee's mortality. The product assessment system 12 may mine electronic news sources 16 for information pertaining to a particular celebrity or endorsee. If the product assessment system 12 receives information related to the death of that particular endorsee or celebrity associated with the product, the product assessment system 12 may use this information to determine that any related products and memorabilia associated with the deceased celebrity may increase in value. Further, the product assessment system 12 may monitor the news sources for information that may have a negative impact on the value of a particular item. For example, when a celebrity receives negative publicity via the media, such negative attention may result in decreased value of the products associated with that celebrity. The product assessment system 12 may receive this type of data to help determine an updated value of a particular product in the specialty market.

At block 72, the product assessment system 12 may receive retail data associated with vendors. The retail data may be retrieved from the vendor information 26 or via a network, the Internet, or the like. As indicated above, the retail data may include the vendor information 26 from retail vendors. Such information may include the pricing of certain products and the availability of certain products (e.g., a number of pairs of designer shoes that may be released). The product assessment system 12 may use this information to determine the retail value of a particular specialty product. The product assessment system 12 may mine for retail data online or may receive retail data sent directly from vendors to keep the system updated on the price, value, and availability of particular items.

Additionally, at block 72, the product assessment system 12 may also receive the vendor information 26 from after-market vendors. The product assessment system 12 may monitor and analyze data received from online distribution or merchant accounts and the like to determine the demand, availability, and value of certain products after they have been released and purchased from the retail vendors. As individuals buy and sell these products via these resale applications and accounts, the product assessment system 12 may use this re-sale data to determine the value, demand, and availability of particular products on the after-market. For example, the product assessment system 12 may receive information from an online merchant account attempting to sell a particular product. The information may include a number of people that are interested in bidding on the item, and the product assessment system 12 may use this data to determine whether demand for the item is increasing or decreasing. The product assessment system 12 may also use this information to determine an updated value for the item based on the increase or decrease in demand. The information may also include pricing data, such as a purchase price for particular items. The product assessment system 12 may use this information to help determine the value of a particular product. Based on the determined value from the received vendor data, the product assessment system 12 may recommend or suggest insurance coverage to cover the products that are associated with an increased value as described below.

After receiving the various types of data in blocks 62-72, the product assessment system 12 may, at block 74, analyze the data by assigning a weight to each type of data, evaluating each data type individually, or the like. The product assessment system 12 may then determine whether such data exceeds certain thresholds set by the user to identify when insurance may be warranted. In any case, it should be noted that the manner in which the product assessment system 12 may identify potential specialty products of the user should not be limited to those described below.

For example, the product assessment system 12 may employ an algorithm that accounts for various different inputs. If a number of people searching or bidding for a particular product reaches a threshold value (e.g., more than 50, 100, 1000 people searching or bidding for a product), the particular product is available for sale in the after-market for a certain percentage greater than its retail value (e.g., when the after-market value is 5%, 10%, 15% greater than the retail value), and/or advertisements or posts in media (e.g., news, social media) are greater than some threshold number (e.g., a number of individual accounts over a period of time, a number of advertisements over a period of time), the product assessment system 12 may identify the product as a specialty product. The threshold value for each dataset may be associated with a particular value for the individual. That is, individuals may be able to change or adjust the threshold value needed to prompt potential insurance coverage associated with a particular product. By adding the threshold value, and allowing a user to adjust the threshold value to their preference, the product assessment system 12 is able to limit the network traffic associated with the user. The number of notifications prompting the user to insure the specialty product may also be limited to cases where insurance may actually be warranted. In some embodiments, the algorithm employed by the product assessment system 12 may assess a portion or subset of the datasets received at blocks 62-72, and may use any combination of datasets to determine whether a user is likely to insure a product. For example, the product assessment system 12 may assign a heavier weight to the data related to an increase in the after-market value of a specialty product than to the data related the number of advertisements regarding a particular product. That is, the product assessment system 12 may determine that specialty product insurance may be warranted when the after-market value exceeds a certain threshold even though the number of advertisements has not exceeded a certain threshold because the data associated with the after-market value increase has been assigned a heavier weight. The detection of a specialty product may cause the product assessment system 12 to generate and send a notification to a user's computing device or display, such that the notification may include an offer for insurance coverage for the identified product.

It should be noted that some specialty products may have an increased value that other individuals may not recognize. That is, the identified specialty product may only have an increased value to a particular individual due to certain circumstances surrounding the specialty product. For example, when an individual receives a gift from a loved one, there may be an inherent value that may not be quantified by the methods described above. The product assessment system 12 may use the ancillary purchases described above to identify when a particular individual might be investing in equipment to protect a specialty item (e.g., display cases, shoe racks, etc.) that the individual acquired through means other than purchasing (e.g., finding the product, receiving the product as a gift, etc.). These ancillary purchases may reflect the user's desire to protect the specialty product. In turn, the product assessment system 12 may use this information as an indicator that the user may own a specialty product that may warrant insurance coverage for sentimental reasons. Since there is not a tangible after-market associated with this specialty item, the product assessment system 12 may use a different threshold value to determine when to offer insurance. For example, after the user has spent a certain amount (e.g., $100, $500, $1000) on these types of ancillary items, this may cause the product assessment system 12 to send a notification offering coverage for a particular item that may be protected by the ancillary purchases as described below.

To determine an appropriate insurance coverage amount for the product, the product assessment system 12 may, at block 76, retrieve information associated with a current value for a particular item. That is, the product assessment system 12 may mine and monitor the data sources described above to determine the current value and the associated demand and popularity (e.g., popularity level) of a particular product. By cross-referencing the vendor information 26 with the user financial data 14, the electronic news sources 16, the social media 18, the user internet data 22, and the other resources 28, the product assessment system 12 may determine the after-market value of a particular specialty product that the user may own.

At block 78, after evaluating the received datasets, the product assessment system 12 may send a notification or alert to the user computing device 30. In some embodiments, the product assessment system 12 may provide a notification for view by the individual display 52 on computing device 30, such that the individual becomes aware of the notification for potential insurance coverage of the detected specialty item or product. It should be noted that the push notification may be transmitted in response to detecting the presence or purchase of a specialty item, the costs of the specialty item exceeding a threshold, and the like. As such, if the product assessment system 12 determines that the after-market value is less than the threshold value, the product assessment system 12 may continue to monitor and collect additional information from the data sources until conditions in which the user may wish to protect or cover the specialty item may be present. In this way, in some embodiments, the user may specify the conditions (e.g., detection of specialty item, popularity trend, demand data, costs) in which the notification may be transmitted to the computing device 30.

As indicated above, the push notification may be sent to computing device 30 and may cause the device to display the notification and request for insurance coverage. The notification may include a description of the identified specialty product or image data, such that the user is aware of the product that is being targeted for insurance. The notification may also include information regarding the determined value of the specialty product, an indication of an increase or decrease in determined value over time, and the like. In some embodiments, the notification may include information pertaining to particular insurance packages that may be purchased to cover the identified product. Such insurance packages may offer coverage up to a certain amount for lost, stolen items, or damaged items. In addition to the indication that insurance coverage may be available for identified products, the notification may have options for the user to select from indicating the user's desire to enroll in a particular insurance package.

At block 80, the product assessment system 12 receives an input from the user approving insurance coverage and the input may be forwarded back to product assessment system 12, which may begin a process to secure insurance coverage for the item. The input may be in the form a text message, phone call, email, or the like. The input received may be representative of different requests or answers provided by a particular individual (e.g., wanting insurance, not wanting insurance, wanting to wait before investing, wanting to receive more information, etc.). For example, the user may have an option on the notification to reply with a text message with a "Y" if interested in insurance coverage, a "N" if not interested in the coverage, or a "STOP" to indicate a request to halt future communications to the computing device 30 regarding the insurance coverage requests. The user may also indicate a desire to wait before buying insurance for a particular product. In some embodiments, the notification may include a phone number, a link to a website or application, or the like for the user to call to receive more information about the potential insurance packages or to speak to a representative of the insurance company. In other embodiments, the notification may be in the form of an email and may include website information that the individual can use to learn more about the insurance coverage. The approval for insurance coverage may allow the product assessment system 12 to initiate collection of data to determine insurance packages suitable for the user.

At block 82, after receiving the user input approving insurance coverage, the product assessment system 12 may initiate the collection of data to determine insurance products and/or packages the user may want to purchase to cover the specialty product. The data received from the user may include financial data, spending limits, deductible information, and the like. Using this information, insurance packages may be tailor-made for each specialty product that has been identified by the product assessment system 12. For example, the data received from the user may include an insurance coverage amount that the user attributes to or requests for the product, a frequency in which the user wants to make payments, an amount for each of the payments, a deductible amount, a type of loss covered by the insurance package, and the like. After the product assessment system 12 receives and analyzes this data, the product assessment system 12 may identify or generate an insurance package to address the user's preferences.

At block 84, the product assessment system 12 may send a notification indicative of the insurance package to the computing device 30 or other suitable device. As mentioned above, the notification may be transmitted via any suitable communication channel (e.g., email, text message). In addition, the notification may automatically cause the computing device 30 to initiate an alert or open an application, such that the user of the computing device 30 may view a visualization representative of the provided insurance package.

Digital Products

Figure 4:
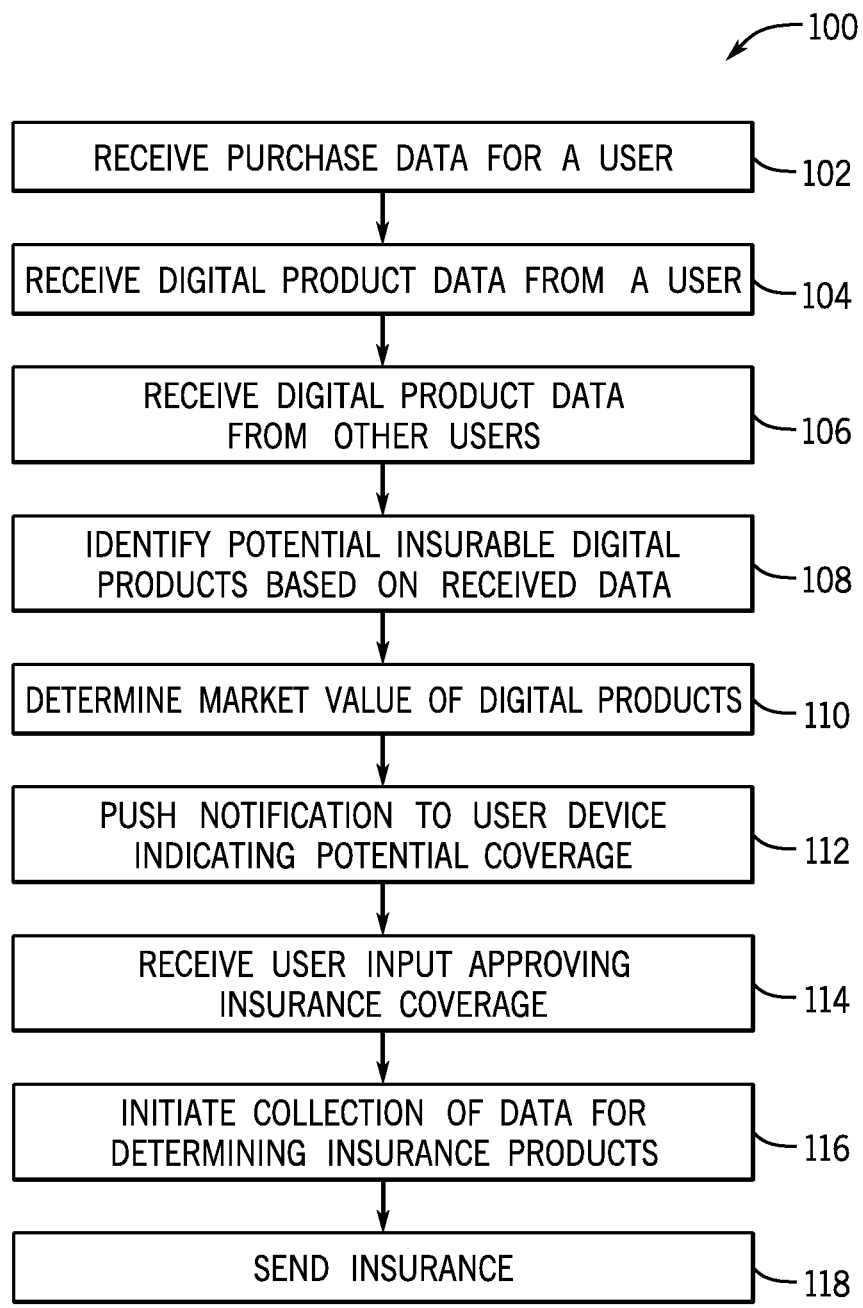
FIG. 4 illustrates a flow chart of a method for identifying, valuing, and insuring digital media products based on received data, in accordance with embodiments described herein.

In some embodiments, the product assessment system 12 may be directed towards providing insurance for digital products that are of interest to a user. That is, a user may invest a certain amount of time, money, and/or resources in a digital product to warrant insurance coverage. FIG. 4 illustrates a flow chart of a method 100 employed by the product assessment system 12 for sending notifications suggesting insurance coverage for identified digital products. Although the following description of the method 100 is described in a particular order, it should be noted that the method 100 is not limited to the depicted order; and instead, the method 100 may be performed in any suitable order. In addition, although the product assessment system 12 is described as performing the method 100, it should be understood that the method 100 may be performed by any suitable computing device including, for instance, the computing device 30 and the like. Further, it should be noted that many of the steps described below perform similarly to those described above, and in some cases, the steps above may be used in the method 100 to help the product assessment system 12 receive the data needed to determine which products may warrant insurance coverage.

At block 102, the product assessment system 12 may receive purchase and financial data associated with a user similar to block 62 from FIG. 3. The purchase and user financial data 14 may be received from various sources including banks, credit unions, credit card companies, retailers, e-wallet accounts, merchant hosting accounts, online distributor accounts, and the like. Generally, the purchase and financial data received at block 102 may provide information regarding the purchase history for the individual associated with product assessment system 12. In some embodiments, the product assessment system 12 may mine the individual's bank account information, credit card information, online purchase records, online sale records, or other suitable information source to identify the user's purchases and corresponding amounts spent on the purchases. For example, the product assessment system 12 may monitor a user's bank account to identify when a user purchases a particular game. After purchasing the game, the product assessment system 12 may receive additional purchase data related to the individual's purchases associated with the game (e.g., when the user purchases a new skin, outfit, weapon, upgrade, etc.). It should be noted that in some embodiments, the user may not purchase the game (e.g., gift, free version, etc.). The product assessment system 12 may continue to monitor the purchase and user financial data 14 of a user to determine when money has been invested or spent by the user while developing a particular digital product.

In some embodiments, the received financial data 14 may include information related to the revenue generated from a digital product. By mining the user's bank account information, the product assessment system 12 may detect a receipt of payment for selling or for advertising a digital product (e.g., receives money from a streaming service) as described in greater detail below.

At block 104, the product assessment system 12 may receive digital product data (e.g., digital media product data) associated with a user. After the product assessment system 12 determines that a user is interested or has invested in developing a digital product (e.g., digital media product), the product assessment system 12 may receive the associated digital product data from various sources including the social media 18, the user internet data 22, or the other resources 28 via a network, the Internet, or the like. Generally, the digital product data may include information related to a particular user's time, money, and other resources spent or invested in developing the digital product. The product assessment system 12 may analyze the data to identify digital products of value to the user. For example, when an individual acquires a certain game, the user may begin developing a character or avatar for that game. As the user progresses through the game and continues to use the character, the user may be given additional options to upgrade the character (e.g., weapons, powers, skills, and the like). The user may also invest money in the character to achieve a particular physical appearance (e.g., male, female, wardrobe, tattoos, accessories, etc.) or to purchase additional skills, powers, weapons, or upgrades that may facilitate the character during gameplay. The time and money spent on developing a particular digital product may correspond to an increased value for the digital product.

In some embodiments, the digital product data received at block 104 may also be related to a user's streaming activities. Such data may include the time an individual spends streaming gameplay, a number of followers the user may have on the streaming service, or any donations or payments the user may receive associated with a particular digital product. As more time and resources are invested in advertising or streaming gameplay, the product assessment system 12 may use this information to identify digital products that may be of value to the individual. Additionally, using the information related to the individual's followers, the product assessment system 12 may recognize and identify digital products of interest to other users. That is, an increased number of followers associated with a digital product may indicate an increased popularity associated with the digital product that may correspond to an increased value. Further, many of the streaming platforms (e.g., Twitch®, YouTube®, Mixer®, UStream®, etc.) allow followers to send money to the individuals streaming the gameplay. By also monitoring the user's financial data 14 as described above, the product assessment system 12 may detect a receipt of payment associated with a digital product. The product assessment system 12 may use this information to determine the value of that digital product based on the received data and the revenue the product is able to generate for the individual, as described below.

In other embodiments, at block 104, the product assessment system 12 may monitor the financial data 14 and digital product data associated with other digital products the user may be developing. For example, when a user sells one digital product, the product assessment system 12 may use this information to compare and determine the value of other digital products that have experienced similar time and resource investments. The digital product data received at block 104 may also include information related to the original creator of the digital product. For example, if a celebrity or athlete decided to sell one of his personal avatars or characters and a user purchased the character, there may be an increased value associated with the product. The product assessment system 12 may use this data to determine whether insurance coverage may be warranted or desired for the digital product. As described below, the product assessment system 12 monitors the user's purchase and financial data 14 and the digital product data to identify and determine when a threshold amount of time, money, and/or resources have been invested to warrant insurance coverage for the digital product.

At block 106, the product assessment system 12 may receive digital profile data of other users. It should be understood that the digital profile data of other users may include the data described above as it pertains to the other users. By receiving digital product data from other users, the product assessment system 12 may monitor and compare digital products to determine a value based on the time, money, and resources an individual has invested in the digital product. For example, a certain amount of time spent developing a particular digital product may correspond to a certain value. Digital products that have undergone similar development time may have similar values. The product assessment system 12 compares this digital product data from other users with the digital product data of the user received at block 104 to determine similarities between the digital products. The product assessment system 12 may then use these similar products to help determine the value of a particular digital product as described in greater detail below.

After receiving the various types of data in blocks 102-106, the product assessment system 12 may, at block 108, analyze the data by assigning a weight to each type of data (e.g., data related to the user's own digital products may be weighted heavier than data related to other user's digital products), evaluating each data type individually, or the like. The product assessment system 12 may then employ an algorithm to determine whether such data exceeds certain thresholds set by the user to identify when insurance may be warranted. In any case, it should be noted that the manner in which the product assessment system 12 may identify potential digital products of the user should not be limited to those described below.

For example, at block 108, the product assessment system 12 may employ an algorithm to determine whether a developed value (e.g., the value related to the time and resources invested) for a particular digital product exceeds some threshold value by a certain percentage (e.g., when the developed value of the digital product is 10%, 15%, 20% greater than the baseline value) or whether the developed value exceeds the baseline value by a certain dollar amount (e.g., when the developed digital product is $100, $500, $1000 greater than the baseline value). In other embodiments, the product assessment system 12 may determine whether the amount of time or money invested in a particular digital product exceeds some threshold value (e.g., when the user has invested more than 5, 10, 15 hours developing a character or when the user has invested more than $100, $500, $1000 developing a character). In still other embodiments, the product assessment system 12 may determine whether a number of individuals following a stream or online medium exceeds a threshold value (e.g., when the individual has 500, 5000, 100,000 viewers on his stream) or when a receipt of revenue for playing with a particular character exceeds some threshold value (e.g., when the user generates more than $1000, $10,000, $50,000). These threshold values may be associated with a particular value for the individual. That is, individuals may be able to change or adjust the threshold value to prompt potential insurance coverage associated with a particular product. By adding the threshold values and allowing a user to adjust the threshold values to their preference, the product assessment system 12 may limit the network traffic associated with the user. The number of notifications prompting the user to insure the digital products may also be limited to cases where insurance may meet the related circumstances. It should also be noted that users may have the option to choose a combination of the threshold values described above and assign different weights to each dataset to suit their preferences. That is, an individual may want to receive a notification for insurance if he has spent more than $1000 developing a character regardless of how much actual time is spent developing the character (e.g., more weight given to datasets associated with the amount of money spent than to datasets associated with the amount of time spent on developing the product). Further, the threshold values are not limited to those described above and may include a number of other options related to, for instance, the user's popularity on social media, the user's ability to develop similar products for sale, and the like. In some embodiments, the product assessment system 12 may utilize the algorithm to assess a portion or subset of the datasets received at blocks 102-106 to determine whether a user is likely to insure a particular product.

At block 110, the product assessment system 12 may retrieve information associated with a current market value for the digital products. That is, the product assessment system 12 may mine and monitor the individual's purchase and financial data and digital product data to determine an amount of money and time a user has invested in developing a particular product. The received data may indicate a particular demand or popularity of a digital product and may be associated with a particular value. Further, the financial data and digital product data received by the product assessment system 12 may be related to sales that the individual or others have made with related or similar digital products. For example, an individual playing a game may develop two characters at the same time. The individual may use the same amount of time, money, and resources to develop the two characters. Then, the user may decide to sell one of the characters that he has developed. Since similar time and resources were invested into each character, the product assessment system 12 may use the transaction history of the first character to determine an approximate value of the second character. Similarly, the product assessment system 12 may receive digital product data of other users to determine a range of values that might be applicable to a certain digital product based on the time and resources spent developing the product. By receiving at least some of the above-described data, the product assessment system 12 may cross-reference the information received to determine the market value of the digital products.

At block 112, after evaluating the received datasets, the product assessment system 12 may send a notification or alert to the user computing device 30. In some embodiments, the product assessment system 12 may provide a notification for view by the individual display 52 on computing device 30, such that the individual becomes aware of the notification for potential insurance coverage of the detected digital product. It should be noted that the push notification may be transmitted in response to detecting the presence of a digital product item (as described above), the investment of time, money, and resources developing the product exceeding a threshold, and the like. As such, if the product assessment system 12 determines that the threshold value for a particular scenario has not been met or exceeded, the product assessment system 12 may proceed to monitor and collect additional information from the various data sources until conditions in which the user may wish to protect or cover the digital product may be present. In this way, in some embodiments, the user may specify the conditions (e.g., detection of digital product, popularity trend, development data) in which the notification may be transmitted to the computing device 30.

As indicated above, at block 112, if the threshold value is met or exceeded, the product assessment system 12 may then send a push notification to the user computing device 30 indicating that insurance coverage is available for a digital product that the user owns. The content and method of delivery of the push notification sent to the user may correspond to the processes described above with respect to blocks 78 and 80 in FIG. 3. It should be noted that the insurance packages offered to cover the digital product may include coverage for when the gaming console is malfunctioning and the user cannot access his developed digital product, or to protect the individual from loss due to theft or technical malfunction (e.g., loss of memory on the game console).

At block 114, the product assessment system 12 may receive an input from the user approving insurance coverage or indicating a desire to enroll or learn more about the potential insurance coverage. The form and content of the input may correspond to the description provided above with respect to blocks 78 and 80 in FIG. 3.

At block 116, after receiving the user input approving insurance coverage, the product assessment system 12 may initiate the collection of data to determine insurance products and/or packages that the user may want to invest in to cover the digital product. The data received from the user may include financial data, spending limits, deductible information, and the like. Using this information, insurance packages may be tailor-made for each digital product identified by the product assessment system 12 and approved for insurance coverage by the user. The received data may include an insurance coverage amount that the user attributes to or requests for the product, a frequency in which the user wants to make payments, an amount for each of the payments, a deductible amount, and a type of loss covered by the insurance package, and the like. After the product assessment system 12 receives and analyzes this data, the product assessment system 12 may identify and generate an insurance package to address the individual's preferences.

At block 118, the product assessment system 12 may send a notification indicative of the insurance package to the computing device 30 or other suitable device. As mentioned above with respect to block 84, the notification may be transmitted via any suitable communication channel (e.g., text message, email). In addition, the notification may automatically cause the computing device 30 to initiate an alert or open an application, such that the user of the computing device 30 may view a visualization representative of the provided insurance package.

Digital Media Presence

Figure 5:
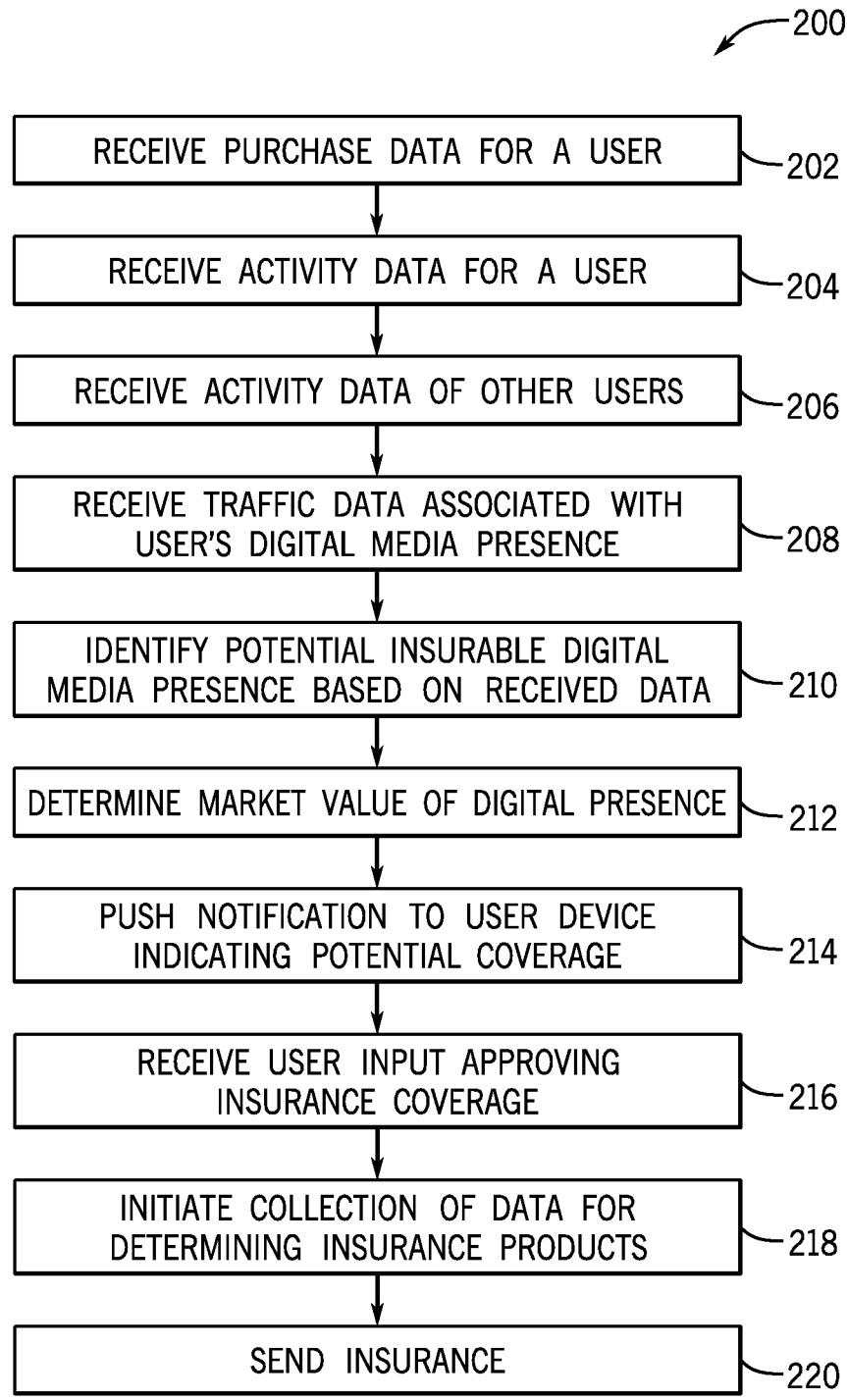
FIG. 5 illustrates a flow chart of a system and method for identifying, valuing, and insuring digital media presences based on received data, in accordance with embodiments described herein.

In other embodiments, the product assessment system 12 may be directed towards providing insurance for a digital media presence developed and/or owned user. That is, a user may invest a certain amount of time, money, and/or resources in a digital media presence to warrant insurance coverage. FIG. 5 illustrates a flow chart of a method 200 employed by the product assessment system 12 for sending notifications suggesting insurance coverage for an identified digital media presence. Although the following description of the method 200 is described in a particular order, it should be noted that the method 200 is not limited to the depicted order; and instead, the method 200 may be performed by any suitable computing device including, for instance, the computing device 30 and the like. Further, it should be noted that many of the steps described below perform similarly to those described above, and in some cases, the steps described above may be used in the method 200 to determine the digital media presences that a user may wish to cover via insurance.

Referring now to FIG. 5, at block 202, the product assessment system 12 may receive purchase and financial data 14 related to an individual. As discussed in detail above with respect to block 62 of FIG. 3 and block 102 of FIG. 4, the product assessment system 12 may receive this purchase and financial data from various sources including banks, credit unions, credit card companies, and the like.

At block 202, the purchase and financial data received by the product assessment system 12 may be associated with equipment that a user has purchased to optimize or enhance his digital media presence. For example, when an influencer purchases equipment (e.g., a camera, a microphone, and lights), the product assessment system 12 may use these purchases to identify and determine that an effort is being made to develop a digital media presence. As the amount of money spent on equipment to enhance the social media page increases, the product assessment system 12 may determine that the user may benefit from covering the digital media presence with insurance based on the amount spent. Further, the purchase and financial data may include an amount spent on advertising the digital media presence. For example, an individual starting a podcast may spend money on a number of advertisements to promote the podcast. As the amount spent on the advertisements increases, the product assessment system 12 may use this data to determine that the user may benefit from insurance coverage. The purchase and financial data 14 may also include data associated with rent payments for a space used to develop or broadcast content.

In some embodiments, the financial data 14 may also include the receipt of payments from fans or from endorsements of the digital media presence. The product assessment system 12 may monitor the financial records and bank accounts of a user and when the user receives a payment associated with a particular digital media presence, the product assessment system 12 may use this information to determine whether insurance coverage may be warranted, given the revenue that the digital media presence is generating. For example, a rising social media influencer may receive an endorsement from a company to advertise the company's product on their social media platform. The endorsement may be detected based on a payment from the company and a corresponding advertisement or mention provided via the digital media posting by the user. The product assessment system 12 may use this payment as an indicator that the digital media presence may generate revenue for the individual. The ability of a digital media presence to generate revenue may cause the user to consider adding insurance coverage for the digital media presence. By monitoring the purchase and financial data of an individual, the product assessment system 12 may determine when a user invests in a digital media presence or is interested in investing in a digital media presence.

At block 204, the product assessment system 12 may receive activity data associated with a user's digital media presence. The product assessment system 12 may receive the activity data from various sources including the social media 18, the user internet data 22, or the other resources 28 via a network, the Internet, or the like. Generally, the activity data may include information related to a particular user's time, money, and other resources spent or invested on developing the digital media presence. The product assessment system 12 may analyze the data to identify and determine digital media presences that may be of value to a particular user. For example, when an individual creates a video sharing account, (e.g., YouTube®, Vine®, TikTok®, etc.) the user may post videos to gain attention. As popularity increases, the individual may invest additional time and resources developing content that followers may enjoy. The product assessment system 12 may use this information to identify and determine digital media presences that may be protected via an insurance coverage. As described in greater detail below, if a threshold amount of time, money, and/or other resources is invested developing a digital media presence, the product assessment system 12 may offer insurance coverage for the digital media presence. The activity data at block 204 may also be related to advertising efforts made to increase the awareness of the digital media presence. Further, individuals may invest in merchandise to sell to fans and participate in certain events to gain notoriety. The product assessment system 12 may use this information as an indicator that the individual is interested in generating revenue from the digital media presence. As such, it may be advantageous for the individual to insure the digital media presence to protect against loss of income if there are malfunctions or disruption with the digital media presence.

At block 206, the product assessment system 12 may receive activity data from other users developing digital media presences. It should be understood that the activity data from other users may include much of the same data described above as it pertains to the other users. For example, such data may include information related to other user's time, money, and resources spent developing their digital media presence. By receiving data from other users, the product assessment system 12 may compare digital media presences that may have similar features (e.g., number of followers, amounts received for advertisements, etc.) with the digital media presence that the user has created. Further, receiving the data from other users may allow the product assessment system 12 to compare digital media presences that have similar amounts of time, money and resources invested for development. By comparing the user's digital media presence with other similar digital media presences, the product assessment system 12 may determine a value associated with the digital media presence, and thus may offer insurance to cover the digital media presence, as described in greater detail below.

At block 208, the product assessment system 12 may receive traffic data (e.g., network traffic data) associated with a user's digital media presence. Similar to the activity data described above, the traffic data may be retrieved from the social media 18 or the other resources 28 and may include information related to the number of followers a digital media presence might have, or the number of viewers or listeners a particular stream or podcast might have. The product assessment system 12 may use the traffic data (e.g., a number of followers, viewers, or listeners) to determine a popularity score associated with a digital media presence. As digital media presences gain recognition and popularity, the users owning or running the digital media presence may be able generate revenue from managing the digital media presence. For example, a user running a social media account may have a certain number of followers when the account is created. As more time and resources are invested into the social media account, the user may notice an increase in the number of people following his account. In turn, the increased followers and traffic associated with the account may correspond to an increase in revenue generating opportunities. The product assessment system 12 may use the traffic data along with the other received data described above to recognize and identify that a user may benefit from or desire insurance coverage for a digital media presence, as described below.

After receiving the various types of data in blocks 202-208, the product assessment system 12 may, at block 210, analyze the data by assigning a weight to each type of data, evaluating each data type individually, or the like. The product assessment system 12 may then employ an algorithm to determine whether such data exceeds certain thresholds set by the user to identify when insurance may be beneficial or desired by the user. In any case, it should be noted that the manner in which the product assessment system 12 may identify potential digital media presences should not be limited to those described below.

For example, at block 210, the product assessment system 12 may employ an algorithm to determine whether the amount of time or money a user has invested developing a digital media presence exceeds some threshold value (e.g., when the user has invested more than $100, $500, $1000 developing a digital media presence or when the user has invested more than 10, 50, 100 hours developing a digital media presence). In other embodiments, the product assessment system 12 may determine whether the amount of revenue generated by the digital media presence exceeds some threshold value (e.g., when the digital media presence generates $500, $1000, $1500 in revenue) or whether the traffic data associated with a certain digital media presence exceeds a threshold value (e.g., when the user acquires 100, 100,000, 1 million viewers, followers, or listeners). These threshold values may be associated with a particular value for the individual. That is, individuals may be able to change or adjust the threshold value needed to prompt potential insurance coverage associated with a particular digital media presence. By adding the threshold value and allowing a user to adjust the threshold value to their preference, the product assessment system 12 may limit the network traffic associated with the user. The number of notifications prompting the user to insure the digital media presences may also be limited to cases where insurance may actually be warranted. It should also be noted that users may have the option to choose a combination of the threshold values described above to suit their preferences. For example, an individual may want to receive a notification for insurance if over 50 hours of time or over $500 on equipment has been invested. In some embodiments, the algorithm utilized by the product assessment system 12 may assess a portion or subset of the datasets received at blocks 202-208 to determine whether a user is likely to insure a particular digital media presence, and different weights may be assigned to the received datasets. That is, a user may want to receive a notification for insurance coverage if he acquires 1 million followers, regardless of how much time has been spent on developing the social media presence (e.g., more weight given to datasets associated with the number of followers than to datasets associated with time spent developing presence).

At block 212, the product assessment system 12 may determine the value of the digital media presence by analyzing the received data. As described above, the product assessment system 12 may use the individual's purchase, financial, activity, and traffic data to determine the amount of money, time, and other resources the individual invested in developing the digital media presence. An increased amount of time and resources may increase the value of the digital media presence. Further, the activity and traffic data may indicate an increased popularity associated with the digital media presence which may correspond to an increased value.

As indicated above, the financial data 14 may also be related to any revenue or income that may be generated by the digital media presence. For example, as a podcast increases in sponsorships, the product assessment system 12 may receive data related to payments from companies that have advertised products on the user's podcast. Such payments may be used by the product assessment system 12 to help determine the overall value of the digital media presence given its propensity for potential revenue generation. Further, the financial data 14 may be related to sales or income generated from similar digital media presences. That is, the product assessment system 12 may receive data related to a number of different digital media presences. By comparing the various digital media presences, the product assessment system 12 may identify similarities between certain profiles. For example, the product assessment system 12 may receive data indicating that a particular user has two million followers on their social media account and gets paid $100,000 for each endorsement made on the account. When another social media account gets within a threshold (e.g., 5%) to two million followers, the product assessment system 12 may compare the new account with the old account to help determine the value of the new account. Thus, based on the amount of time, money, and resources invested, along with the traffic data and the data from other digital media presences, the product assessment system 12 may determine the relative value associated with the digital media presence.

At block 214, after evaluating the received datasets, the product assessment system 12 may send a notification or alert to the user computing device 30. In some embodiments, product assessment system 12 may provide a notification for view by the individual display 52 on computing device 30, such that the individual becomes aware of the notification for potential insurance coverage of the detected digital media presence. It should be noted that the push notification may be transmitted in response to detecting the presence of a digital media presence (as described above), the investment of time, money, and resources developing the presence exceeding a threshold, and the like. As such, if the product assessment system 12 determines that the threshold value for a particular scenario has not been met or exceeded, the product assessment system 12 may proceed to monitor and collect additional information from the various data sources until conditions in which the user may wish to protect or cover the digital media presence may be present. In this way, in some embodiments, the user may specify the conditions in which the notification may be transmitted to the computing device 30.

As indicated above, at block 214, if the selected threshold value is met or exceeded, the product assessment system 12 may then send a push notification to the user indicating that insurance coverage is available for a digital media presence that the user owns. The content and delivery method of the notification may correspond to the description provided above with respect to blocks 78 and 80 in FIG. 3. It should be noted that the insurance packages offered to cover the digital media presence may include coverage for when the user is unable to access the digital media presence due to site maintenance, or the like. Coverage may also be provided for when hackers disable or corrupt certain digital media presences or when potential disruptions occur that prevent the individual from accessing or using the digital media presence as intended. For example, if the building where the individual records the podcast is undergoing construction, the individual temporarily may not be able to record his podcast. The insurance package may provide a means of income while the digital media presence cannot be accessed.

At block 216, the product assessment system 12 may receive an input from the user indicating approval or desire to enroll or learn more about the potential insurance coverage. Again, the form and content of the user input have already been described with respect to blocks 78 and 80 in FIG. 3.

At block 218, after receiving input from the user approving insurance coverage, the product assessment system 12 may initiate the collection of data to determine which insurance products and/or packages the user may want to invest in to cover the digital media presence. The data received from the user may include financial data, spending limits, deductible information, and the like. Using this information, insurance packages may be tailor-made for each digital media presence identified by the product assessment system 12 and approved for insurance coverage by the user. The type of data received by the product assessment system 12 to formulate the insurance packages may correspond to the descriptions described above with respect to block 82 in FIG. 3, and block 116 of FIG. 4. After the product assessment system 12 receives and analyzes this data, the product assessment system 12 may identify and generate an insurance package to address the individual's preferences.

At block 220, the product assessment system 12 may send a notification indicative of the insurance package to the computing device 30 or other suitable device. As mentioned above with respect to block 84 of FIG. 3, the notification may be transmitted via any suitable communication channel (e.g., text message, email). In addition, the notification may automatically cause the computing device 30 to initiate an alert or open an application, such that the user of the computing device 30 may view a visualization representative of the provided insurance package.

It should be noted that in any of the embodiments described above, the product assessment system 12 monitors and dynamically scrapes for data continuously in real-time to provide current analysis for the users. The product assessment system 12 may also receive data indicative of a decrease in value associated with the product or presence. If the product assessment system 12 detects that a particular product or presence has decreased in value, the product assessment system 12 may send a new notification advising the individual to update the insurance coverage accordingly (e.g., reduce or limit coverage).

In the embodiments described above, the product assessment system 12 may also monitor individual users for potential abuse of the system. Security measures may be put in place to ensure that claims submitted to insurance companies have a valid basis and are not an attempt by the individual to receive a quick payout or manipulate the system (e.g., once the insurance company has provided higher coverage for a particular specialty product, the product goes missing). To prevent problems like this, the product assessment system 12 may request users to upload pictures associated with the damage of a product, or to upload pictures associated with loss due to theft (e.g., pictures of break in, etc.). The product assessment system 12 may also monitor online records and databases and receive data to determine whether certain websites are down for maintenance. A number of other security measures may be put in place to ensure valid claims are brought and thus should not be limited to the scenarios described above.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
one or more sensors configured to acquire activity data associated with a user; and
a computing device comprising a processor and a memory, wherein the memory stores instructions configured to cause the processor to:
receive purchase data associated with one or more products purchased by the user;
receive the activity data from the one or more sensors, wherein the online activity data is indicative of a plurality of activities performed by the user, wherein the plurality of activities is associated with information pertaining to the one or more products;
receive online data from a plurality of sources, wherein the online data is indicative of an additional plurality of activities performed by the user and one or more other activities performed by one or more other users, wherein the additional plurality of activities and the one or more other activities are associated with additional information pertaining to the one or more products;
receive vendor information from one or more vendors comprising retail sales data, after-market sales data, and product availability associated with the one or more products;
determine one or more values of the one or more products based on the purchase data, the activity data acquired by the one or more sensors, the online data, and the vendor information;
determine that the one or more products correspond to one or more specialty products based on the one or more values of the one or more products exceeding one or more user-defined threshold values; and
send a notification to an additional computing device associated with the user in response to the one or more products corresponding to the one or more specialty products, wherein the notification is configured to activate the additional computing device to display an offer for insurance for the one or more products.

2. The system of claim 1, wherein the processor is configured to:
receive event data from one or more electronic news sources, wherein the event data is indicative of an association between an endorsee and the one or more products; and
determine a change in the one or more values based on the association.

3. The system of claim 1, wherein the processor is configured to determine that the one or more products correspond to the one or more specialty products by:
quantifying an amount of interest of the user in the one or more products based on the activity data acquired by the one or more sensors; and
determining that the amount of interest of the user in the one or more products exceeds a user-defined threshold value.

4. The system of claim 3, wherein the amount of interest of the user in the one or more products is determined based on a first amount of time spent by the user searching for the one or more products, a second amount of time spent by the user on an application associated with the one or more products, a first number of searches performed by the user associated with the one or more products, a second number of trips by the user to a vendor selling the one or more products, or any combination thereof.

5. The system of claim 4, wherein the processor is configured to determine that the amount of interest in the one or more products exceeds the user-defined threshold value based on the first amount of time spent by the user searching for the one or more products exceeding a threshold amount of time.

6. The system of claim 4, wherein the processor is configured to determine that the amount of interest in the one or more products exceeds the user-defined threshold value based on the first number of searches performed by the user associated with the one or more products exceeding a threshold number of searches.

7. The system of claim 3, wherein the one or more sensors comprise a global positioning system (GPS) sensor configured to acquire location data associated with the user, wherein the location data is indicative of a location of the user, and wherein the processor is configured to determine that the amount of interest exceeds the user-defined threshold value based on the location of the user being within a threshold distance to the vendor selling the or more products.

8. The system of claim 4, wherein the processor is configured to determine that the amount of interest in the one or more products exceeds the user-defined threshold value based on the second number of trips by the user to the vendor selling the one or more products exceeding a threshold number of trips.

9. The system of claim 1, wherein the processor is configured to determine whether the one or more products correspond to the one or more specialty products by determining that a popularity level associated with the one or more products exceeds a threshold popularity level based on the online data associated with the one or more other users.

10. The system of claim 9, wherein the popularity level of the one or more products is determined based on an amount of network traffic from the one or more other users associated with the one or more products, wherein an increase in the amount of network traffic is indicative of an increase in the popularity level of the one or more products.

11. The system of claim 10, wherein the amount of network traffic is determined based on a first cumulative amount of time spent by the one or more other users searching for the one or more products, a second cumulative amount of searches performed by the one or more other users associated with the one or more products, a first number of the one or more other users searching for the one or more products, or any combination thereof.

12. The system of claim 1, wherein the one or more sensors comprise a camera configured to acquire image data associated with the user, wherein the image data is indicative of an amount of time spent by the user searching for the one or more products, and wherein the processor is configured to determine that the one or more products correspond to the one or more specialty products based on the amount of time exceeding a threshold amount of time.

13. A non-transitory, computer-readable medium comprising computer-executable instructions configured to, when executed, cause a processor to:
receive purchase data associated with one or more products purchased by a user;
receive activity data from one or more sensors, wherein the activity data is indicative of a plurality of activities performed by the user, wherein the plurality of activities is associated with information pertaining to the one or more products;
receive online data from a plurality of sources, wherein the online data is indicative of an additional plurality of activities performed by the user and one or more other activities performed by one or more other users, wherein the additional plurality of activities and the one or more other activities are associated with additional information pertaining to the one or more products;
receive vendor information from one or more vendors comprising retail sales data, after-market sales data, and product availability associated with the one or more products;
determine one or more values of the one or more products based on the purchase data, the activity data acquired by the one or more sensors, the online data, and the vendor information;
determine that the one or more products correspond to one or more specialty products based on the one or more values of the one or more products exceeding one or more user-defined threshold values; and
send a notification to a computing device associated with the user in response to the one or more products corresponding to the one or more specialty products, wherein the notification is configured to activate the computing device to display an offer for insurance for the one or more products.

14. The non-transitory, computer-readable medium of claim 13, wherein the processor is configured to determine that the one or more products correspond to the one or more specialty products by:
quantifying an amount of interest of the user in the one or more products based on the activity data acquired by the one or more sensors; and
determining that the amount of interest of the user in the one or more products exceeds a user-defined threshold value.

15. The non-transitory, computer-readable medium of claim 14, wherein the amount of interest of the user in the one or more products is determined based on a first amount of time spent by the user searching for the one or more products, a second amount of time spent by the user on an application associated with the one or more products, a first number of searches performed by the user associated with the one or more products, a second number of trips by the user to a vendor selling the one or more products, or any combination thereof.

16. The non-transitory, computer-readable medium of claim 13, wherein the activity data comprises one or more inputs and wherein the processor is configured to:
assign one or more weights to the one or more inputs;
determine an amount of interest points to assign to the one or more inputs based on the one or more weights; and
determine that the one or more products correspond to the one or more specialty products based at least in part on the amount of interest points associated with at least one of the one or more inputs exceeding a threshold number of interest points.

17. A method, comprising:
receiving, via a processor, purchase data associated with one or more products purchased by a user;
receiving, via the processor, activity data from one or more sensors, wherein the activity data is indicative of a plurality of activities performed by the user, wherein the plurality of activities is associated with information pertaining to the one or more products;
receiving, via the processor, online data from a plurality of sources, wherein the online data is indicative of an additional plurality of activities performed by the user and one or more other activities performed by one or more other users, wherein the additional plurality of activities and the one or more other activities are associated with additional information pertaining to the one or more products;

receiving, via the processor, vendor information from one or more vendors comprising retail sales data, after-market sales data, and product availability associated with the one or more products;

determining, via the processor, one or more values of the one or more products based on the purchase data, the activity data acquired by the one or more sensors, the online data, and the vendor information;

determining, via the processor, that the one or more products correspond to one or more specialty products based on the one or more values of the one or more products exceeding one or more user-defined threshold values; and sending, via the processor, a notification to a computing device associated with the user in response to the one or more products corresponding to the one or more specialty products, wherein the notification is configured to activate the computing device to display an offer for insurance for the one or more products.

18. The method of claim 17, wherein determining that the one or more products corresponds to one or more specialty products is based at least in part on:

quantifying, via the processor, an amount of interest of the user in the one or more products based on the activity data acquired by the one or more sensors; and determining, via the processor, that the amount of interest of the user in the one or more products exceeds a user-defined threshold value.

19. The method of claim 18, wherein the amount of interest of the user in the one or more products is determined based on a first amount of time spent by the user searching for the one or more products, a second amount of time spent by the user on an application associated with the one or more products, a first number of searches performed by the user associated with the one or more products, a second number of trips by the user to a vendor selling the one or more products, or any combination thereof.

20. The method of claim 17, comprising:

receiving, via the processor, event data from one or more electronic news sources, wherein the event data is indicative of an association between an endorsee and the one or more products; and determining, via the processor, a change in the one or more values based on the association.

* * * * *